Figure 2:
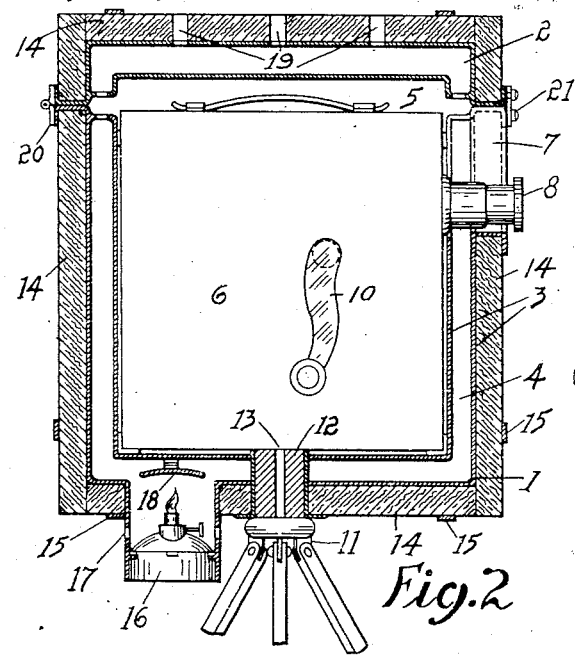

H. CRONJAGER.
CAMERA.
APPLICATION FILED JUNE 19, 1912.

1,056,507.

Patented Mar. 18, 1913.

Witnesses:
C. E. Brown
W. A. Hardy

Inventor:
Henry Cronjager
by Frank L. Weir
Atty.

UNITED STATES PATENT OFFICE.

HENRY CRONJAGER, OF NEW YORK, N. Y.

CAMERA.

1,056,507.  Specification of Letters Patent.  Patented Mar. 18, 1913.

Application filed June 19, 1912. Serial No. 704,491.

*To all whom it may concern:*

Be it known that I, HENRY CRONJAGER, a citizen of the United States, and a resident of the city, county, and State of New York, have invented certain new and useful Improvements in Cameras, of which the following is a description.

My invention relates to cameras and especially to an improved case for motion picture and other cameras.

The principal object of my invention is to maintain the camera and the film therein in a warm condition while working in a cold climate. In taking motion pictures in a cold, dry climate, much difficulty has heretofore been experienced in obtaining clear negatives because of the production of "static flashes" on the film due to the action, on the sensitized surface of the film, of the static electricity generated by the rapid movement of the film in the operation of the camera. Low temperatures also render the film brittle and consequently it frequently breaks during operation of the camera.

It is the purpose of my invention to obviate these disadvantages.

In carrying out my invention, I preferably employ a case for receiving the camera, which case is so constructed as to provide an air chamber adapted to substantially inclose the camera, and suitable means for heating the air in said chamber. My invention may also be used to advantage with cameras ordinarily employed for single exposures, as its use increases the speed of the film, enabling good negatives to be obtained with very little light, and improves the quality of the tone of the negatives.

With my apparatus I have exposed fifteen thousand feet of motion picture film, in mid-winter in the woods of Maine without once breaking the film, and the resulting negatives have been entirely free from "static flashes." I have also made an exposure in the woods during a snow storm at 5:30 p. m., with almost all light gone, and have obtained a full time negative.

In order that my invention may be more clearly understood, attention is directed to the accompanying drawings in which the same reference characters are used to designate corresponding parts throughout and in which—

Figure 3:
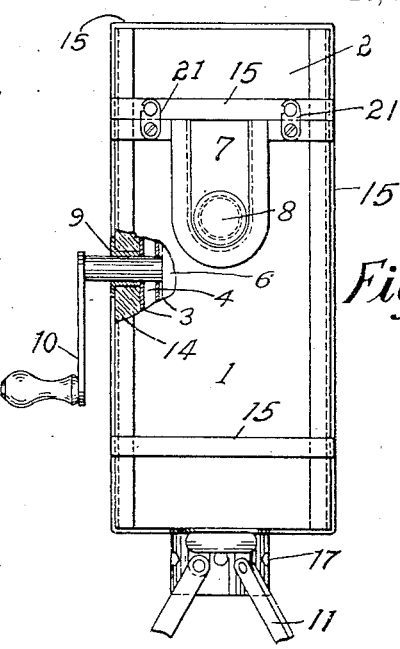
Figure 1:
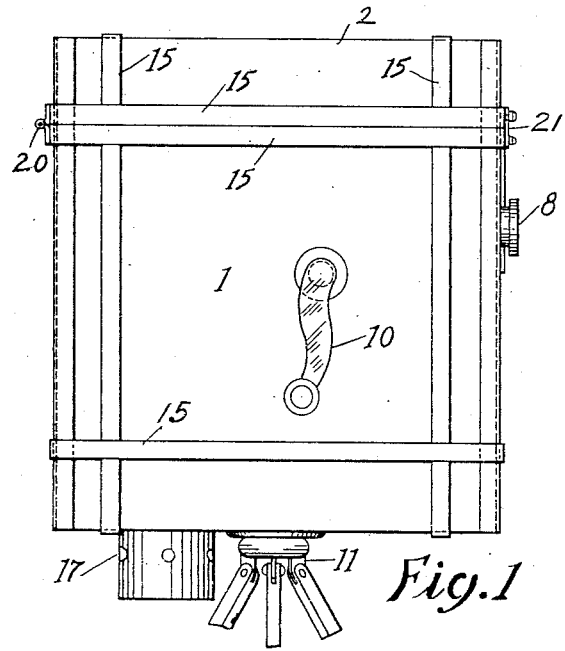
Figure 4:
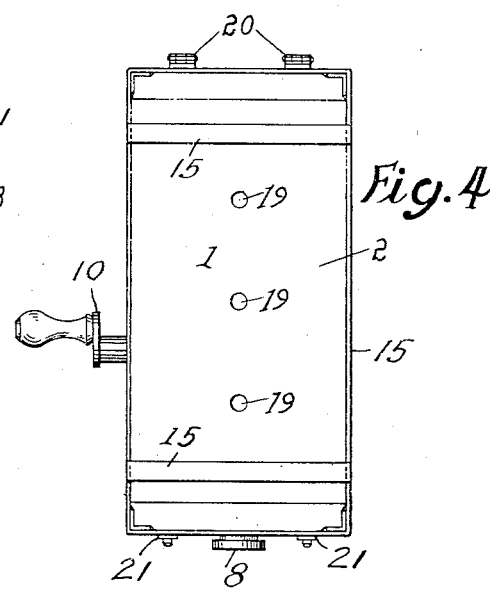

Figure 1 is a side elevation of an apparatus, constructed in accordance with my invention, and carrying a moving picture camera; Fig. 2 is a longitudinal central section of the apparatus, the camera being shown in elevation; Fig. 3 is a front elevation, partly in section, and Fig. 4 is a top plan view.

Referring to the drawings, reference character 1 designates my improved case which is preferably constructed in the form of a double walled box having a hinged cover 2. The walls 3 of the box are preferably formed of a suitable sheet metal, such as copper, and are spaced to form an air chamber 4, inclosing a compartment 5. The compartment 5 is of a size to receive snugly the camera 6, for which the case is adapted. In the front of the case is an opening or slot 7 registering with the lens tube 8 of the camera, and in one side of the case is another opening 9 for the operating crank 10. The case may also be provided with a suitable opening (not shown) to enable the operator to properly focus the camera. In order that the case may be secured to the tripod 11, I provide a block 12 in the bottom of said case having a hole or socket 13 therein for the reception of the tripod screw. The outer walls of the box may be provided with a substantially non-heat conducting covering 14 of suitable material, such as felt, suitably held in place as by strips 15. While any suitable means may be provided for heating the air in chamber 4, I prefer to employ an alcohol lamp 16 which may be removably mounted in a lamp socket 17, said socket being preferably formed integral with one of the walls 3 of the box and communicating with chamber 4. A deflecting plate 18 above the lamp socket serves to dissipate the heat from the lamp into the chamber 4. The cover 2 is suitably apertured, as at 19, to permit the escape of foul air and to create the necessary draft. Of course, in warm weather the use of the case is unnecessary and if for this or any other reason, it is desirable to remove the camera from the case, it will be apparent that this may readily be accomplished after the removal of the crank 10 and on swinging cover 2 about its hinges 20 into open position. Latches 21 are provided for holding the cover 2 in closed position.

While I have described my apparatus as applied to a motion picture camera, it will be apparent that by proper arrangement of the apertures in the case, it may readily be adapted for use with any type of camera.

Having now disclosed the nature of my invention and specifically described one embodiment thereof, what I claim and desire to protect by Letters Patent is:

1. A case for cameras comprising means providing an air chamber adapted to substantially inclose the camera, said case being suitably apertured to permit operation of the camera, substantially as described.

2. A case for cameras comprising means providing an air chamber adapted to substantially inclose the camera, said case being provided with a lamp socket communicating with said air chamber and said case being suitably apertured to permit operation of the camera, substantially as described.

3. In a device of the character described, a case for cameras comprising means providing an air chamber adapted to entirely inclose the camera body, said case being provided with a lamp socket communicating with said chamber and said case being suitably apertured to permit operation of the camera, and an outer covering for the case consisting of a substantially non-heat conducting material, substantially as described.

4. In a device of the character described, a case for cameras comprising means providing an air chamber adapted to entirely inclose the camera body, said case being provided with a lamp socket communicating with said chamber and said case being suitably apertured to permit operation of the camera, and an outer covering of felt for the case, substantially as described.

5. In a device of the character described, a case for cameras comprising means providing an air chamber adapted to substantially inclose the camera, said case being suitably apertured to permit operation of the camera, and means connected with said case for heating the air in said chamber, substantially as described.

6. In a device of the character described, a case for cameras comprising means providing an air chamber adapted to substantially inclose the camera, said case being suitably apertured to permit operation of the camera, and a lamp connected with said case for heating the air in said chamber, substantially as described.

7. A case for cameras, comprising means providing an air chamber adapted to substantially inclose the camera, the bottom of said case being provided with a lamp socket communicating with said chamber, and the top of said case being provided with an aperture communicating with the outside atmosphere and said chamber, said case being suitably apertured to permit operation of the camera, substantially as described.

8. A case for cameras comprising a double walled box providing a camera compartment, the walls of said box being spaced to form an air chamber inclosing said compartment, said box having a hinged perforated cover, the perforations of which communicate with said chamber, the bottom of said box being provided with a lamp socket communicating with said chamber, and said box being suitably apertured to permit operation of the camera, substantially as described.

9. A case for cameras comprising a double walled box providing a camera compartment, the walls of the box being spaced to form an air chamber inclosing said compartment, the outer walls of the box being provided with a substantially non-heat conducting covering, the box being apertured to permit operation of the camera, and one wall of said box having a lamp-socket communicating with said chamber, substantially as described.

10. A case for cameras comprising a double walled box providing a camera compartment, the walls of said box being spaced to provide an air chamber substantially inclosing said compartment, the outer walls of said box having a covering of felt, said box being suitably apertured to permit operation of the camera, and heating means connected with said box for heating the air in said chamber, substantially as described.

11. The combination with a camera, of a case therefor comprising means providing an air chamber substantially inclosing the camera, said case being suitably apertured to permit operation of the camera, and heating means connected with said case for heating the air in said chamber, substantially as described.

12. The combination with a camera, of a case therefor comprising means providing an air chamber substantially inclosing the camera, and heating means connected with said case for heating the air in said chamber, said case being provided with an aperture registering with the lens tube of said camera, and another aperture through which the operating crank of said camera extends to the outside of the case, substantially as described.

13. A portable self-contained apparatus comprising a camera, and means applied thereto for heating the air therewithin, substantially as described.

14. A portable self-contained apparatus comprising a camera, and means applied thereto for heating the air thereabout and therewithin, substantially as described.

15. A self-contained apparatus comprising a camera, heat insulating means substantially inclosing the camera, and means for heating the air within the camera, substantially as described.

16. A self-contained apparatus comprising a camera, means for inclosing the same and providing an air chamber substantially inclosing the camera, and means for heating the air within said chamber and said camera, substantially as described.

This specification signed and witnessed this 10 day of May 1912.

HENRY CRONJAGER.

Witnesses:
MARTIN L. O'HARA,
MARGARET MORAN.